(12) United States Patent
Dunn et al.

(10) Patent No.: US 6,699,450 B2
(45) Date of Patent: Mar. 2, 2004

(54) CARBIDE MATERIAL BY ELECTROMAGNETIC PROCESSING

(75) Inventors: Michael P. Dunn, Clarence Center, NY (US); Michael L. Dunn, Wilson, NY (US)

(73) Assignee: Redunndant Materials, Inc., Clarence Center, NY (US)

( * ) Notice: Subject to any disclaimer, the term of this patent is extended or adjusted under 35 U.S.C. 154(b) by 172 days.

(21) Appl. No.: 09/811,889

(22) Filed: Mar. 19, 2001

(65) Prior Publication Data

US 2001/0011059 A1 Aug. 2, 2001

Related U.S. Application Data

(62) Division of application No. 09/227,686, filed on Jan. 8, 1999, now abandoned.

(51) Int. Cl.[7] .............................................. C01B 31/30
(52) U.S. Cl. ..................... 423/291; 423/440; 423/439; 423/345; 204/157.43; 204/157.45; 204/157.47
(58) Field of Search ...................... 204/157.45, 157.43, 204/157.47; 422/186; 423/439, 440, 291, 345

(56) References Cited

U.S. PATENT DOCUMENTS

| | | | | |
|---|---|---|---|---|
| 2,431,326 A | * | 11/1947 | Heyroth ...................... 252/516 |
| 3,348,967 A | * | 10/1967 | Hucke ......................... 427/399 |
| 3,758,662 A | * | 9/1973 | Tobin et al. ................. 264/332 |
| 4,095,974 A | * | 6/1978 | Matovich ...................... 75/345 |
| 4,110,084 A | | 8/1978 | Lee et al. ...................... 51/307 |
| 4,141,948 A | * | 2/1979 | Laskow et al. ............. 264/101 |
| 4,179,299 A | | 12/1979 | Coppola et al. .............. 106/44 |
| 4,221,762 A | * | 9/1980 | Andrjushin et al. ........ 422/186 |
| 4,240,835 A | | 12/1980 | Laskow et al. .............. 106/44 |
| RE30,503 E | | 2/1981 | Lee et al. ..................... 51/307 |
| 4,265,843 A | * | 5/1981 | Dias et al. ................... 264/431 |
| 4,294,788 A | | 10/1981 | Laskow et al. ............. 264/101 |
| 4,312,954 A | | 1/1982 | Coppola et al. .............. 501/90 |
| 4,353,963 A | | 10/1982 | Lee et al. ..................... 428/408 |
| 4,376,963 A | | 3/1983 | Knoop et al. ................ 360/135 |
| 4,411,963 A | | 10/1983 | Aine ........................... 428/622 |
| 4,417,906 A | | 11/1983 | Ohno .......................... 51/307 |
| 4,505,787 A | * | 3/1985 | Fuller et al. ................. 205/340 |
| 4,525,461 A | | 6/1985 | Boecker et al. .............. 501/90 |
| 4,528,212 A | | 7/1985 | Cairns et al. ................. 427/96 |
| 4,598,017 A | | 7/1986 | Bayer et al. ................. 428/336 |
| 4,660,114 A | | 4/1987 | Yamakawa et al. ......... 360/122 |
| 4,661,420 A | | 4/1987 | Nakamura et al. .......... 428/692 |
| 4,738,885 A | | 4/1988 | Matsumoto .................. 428/64 |
| 4,759,836 A | | 7/1988 | Hill et al. ............... 204/192.21 |
| 4,833,020 A | | 5/1989 | Shiroishi et al. ............ 428/336 |
| 4,840,844 A | | 6/1989 | Futamoto et al. ........... 428/336 |
| 4,859,638 A | | 8/1989 | Wada et al. .................. 501/58 |
| 4,877,690 A | | 10/1989 | Glocker et al. .............. 428/627 |
| 4,886,652 A | * | 12/1989 | Krishnan et al. ............ 423/439 |
| 4,915,924 A | * | 4/1990 | Nadkarni et al. ............ 423/345 |
| 4,953,051 A | | 8/1990 | Wada et al. .................. 360/126 |
| 4,994,330 A | | 2/1991 | Steininger ................... 428/336 |
| 5,098,541 A | | 3/1992 | Funkenbusch .......... 204/192.15 |
| 5,165,981 A | | 11/1992 | Yamakawa et al. ......... 428/141 |
| 5,190,631 A | | 3/1993 | Windischmann et al. ....................... 204/192.15 |
| 5,200,249 A | | 4/1993 | Dolhert et al. ............... 428/137 |
| 5,225,951 A | | 7/1993 | Kira et al. ................... 360/113 |
| 5,294,489 A | | 3/1994 | Luthra et al. ................ 428/379 |
| 5,316,851 A | | 5/1994 | Brun et al. .................. 428/379 |
| 5,326,607 A | | 7/1994 | Muramatsu et al. .......... 428/65 |
| 5,326,637 A | | 7/1994 | Nasu et al. .................. 428/336 |
| 5,330,854 A | | 7/1994 | Singh et al. ................. 428/698 |
| 5,338,576 A | * | 8/1994 | Hanzawa et al. ......... 427/430.1 |
| 5,480,695 A | | 1/1996 | Tenhover et al. ........... 428/65.5 |
| 5,552,352 A | | 9/1996 | Brun et al. ................... 501/88 |
| 5,626,943 A | | 5/1997 | Tenhover .................... 428/141 |

FOREIGN PATENT DOCUMENTS

JP        62167212 A    *  7/1987

* cited by examiner

Primary Examiner—Stuart L. Hendrickson
Assistant Examiner—Peter J Lish
(74) Attorney, Agent, or Firm—Michael L. Dunn

(57) ABSTRACT

A method for the manufacture of a structure from a carbide of a group IIa, group IIIa, group IVa, group IVb, group Vb, group VIb, group VIIb or group VIIIb carbon reactive element including the steps of: mixing the element with the carbon; and heating the carbon and the element to melt the element so that it reacts with the carbon to form the carbide; wherein, the carbon and element are heated by means of electromagnetic radiation having a frequency below the infrared spectrum. The method does not waste energy by unnecessary heating of the furnace or surrounding mold. The mold itself may be more stable because it is only heated by hot contained material and not by other sources of heat. Resulting formed products are not a sintered product and may approach one hundred percent of theoretical density. The carbon may be in the form of a powder that is mixed with the element or may be a porous carbon structure such as a graphite fiber mat or sheet into which the carbon reactive element is melted. When a powder is used, it is usually a graphite powder. The preferred carbides prepared in accordance with the present invention are refractory carbides. Examples of preferred carbon reactive elements for use in accordance with the present invention are boron, chromium, hafnium, iron, molybdenum, niobium, silicon, tantalum, titanium, tungsten, vanadium, and zirconium. A preferred group IIIa element for use in accordance with the present invention is boron. The most preferred element of group IVa), is silicon. Silicon carbide is hard, high melting, almost chemically inert, and has excellent dielectric properties.

21 Claims, No Drawings

CARBIDE MATERIAL BY ELECTROMAGNETIC PROCESSING

This is a Division of abandoned application Ser. No. 09/227,686, filed Jan. 8, 1999 now abandoned.

BACKGROUND OF THE INVENTION

This invention relates to carbides, particularly carbides of group IIa, IIIa, IVa, IVb, Vb, VIb, VIIb and VIIb carbon reactive elements and to their method of preparation.

Carbides may generally be defined as compounds of carbon with metals, transition metals or silicon. Carbides usually have high melting points and are not readily volatilized. They are usually produced by heating appropriate mixtures to high temperatures in electric furnaces.

The largest group of carbides is the acetyledic group, including the carbides of beryllium, calcium, strontium, sodium, potassium, copper, silver, gold, and nickel. The acetylides, the most important of which is calcium carbide, form acetylene by reaction with water or acids. Another group, consisting of aluminum, beryllium, and manganese carbides, is termed the methanides. These yield methane on reaction with water or acids.

Important metallic carbides include iron carbide, or cementite, the hardening constituent in steel; tungsten carbide, from which are made hard tools for the machining of tough metals; and boron carbide, a material almost as hard as diamond. An important nonmetallic carbide is silicon carbide, or carborundum, which is used as an abrasive.

Refractory carbides, i.e. carbides that melt above $1,400°$ C. and are chemically stable are important for the manufacture of high performance materials. Such carbides are usually formed from group IIIa, IVa, IVb, VIb, VIb and VIIIb elements. Examples of refractory carbides and their approximate melting points include: boron carbide $2350°$ C., chromium carbide $1980°$ C., hafnium carbide $3890°$ C., iron carbide $1837°$ C., molybdenum carbide $2692°$ C., niobium carbide $3500°$ C., silicon carbide $2700°$ C., tantalum carbide $3880°$ C., titanium carbide $3140°$ C., tungsten carbide $2870°$ C., vanadium carbide $2810°$ C., and zirconium carbide $3540°$ C. Aluminum carbide $1400°$ C. is also often included within this group even though it may decompose to methane upon exposure to water.

Such refractory carbides have found broad utility due to their high melting points, strength, close crystal structure, electrical properties as insulators or semi-conductors and chemical resistance. Silicon carbide is the most commonly used refractory carbide due to inexpensive materials needed for preparation (silicon and carbon) exceptional hardness, chemical resistance and heat resistance. Silicon carbide is thus most commonly used as an abrasive but has also been used in heat insulating materials, electrical insulating materials, reflective materials and to form heat resistant parts, e.g. in turbines. Boron carbide is one of the hardest materials known to man rivaling the hardness of diamond. Boron carbide may thus be found in high performance abrasives. Iron carbide is used as a hardener in steel and tungsten carbide is used as a hard surface on tools. Germanium carbide has been used in infrared transparent materials and in photoreceptors.

Carbides are generally prepared by four methods including: a) preparation in melt; b) preparation by carburization of powdered metal, metal hydrides or oxides with solid carbon; c) reduction of halides with a hydrogen hydrocarbon gas mixture and d) chemical separation from carbon-saturated ferroalloys or metal baths.

Despite the many advantages of carbide materials, until now the carbides and especially shaped parts from them have been very difficult to manufacture. Most of the chemically resistant refractory carbides are made by reaction of carbon with certain members of the group IIIa, IVa, IVb, Vb, VIb, and VIIIb elements, either as nascent metals or as their oxides according to the equations $M+C \rightarrow MC$ or $MO+2C \rightarrow MC+CO$. Such reactions usually occur at very high temperatures in very hot furnaces.

When carbides are made by bulk processing of powdered materials. e.g. electrical resistance heating of a mixture of carbon and silica in a pile around a carbon resistance core, the carbide (silicon carbide) is randomly formed around the core in a large porous structure which permits gas to escape. The silicon carbide must then be separated, in the form of relatively small crystals, from unreacted carbon and silica. Preparation of defined parts by this method is virtually impossible.

Attempts to form carbides into particular shapes at the time of their preparation have met with only limited success. It is difficult to form a specific shape at such temperatures by means of a mold and huge quantities of energy are wasted heating both the mold and furnace. Formed shapes thus often do not meet required tolerances and subsequent machining of such hard materials is difficult and extremely expensive.

It has therefore been found to actually be more cost effective to form carbide materials in bulk, comminute the carbide to micron size powders and then sinter the powders to obtain the desired formed product.

BRIEF DESCRIPTION OF THE INVENTION

In accordance with the invention there is therefore provided an entirely new method for forming carbide shapes at the time of preparation of the carbide. The method does not waste energy by unnecessary heating of the furnace or surrounding mold. The mold itself may be more stable because it is only heated by hot contained material and not by other sources of heat. Resulting formed products are not a sintered product and may approach one hundred percent of theoretical density.

In accordance with the invention a method is provided for the manufacture of a structure from a carbide of a group IIa, group IIIa, group IVa, group IVb, group Vb, group VIb, group VIIb or group VIIIb carbon reactive element. The method includes the steps of:

mixing the carbon reactive element in the form of a powder with the carbon; and heating the carbon and the element to melt the element so that it reacts with the carbon to form the carbide; wherein, the carbon and element are heated by means of electromagnetic radiation having a frequency below the infrared spectrum.

The carbon may be in the form of a powder that is mixed with the element or may be a porous carbon structure such as a graphite fiber mat or sheet into which the carbon reactive element is melted. When a powder is used, it is usually a graphite powder.

The preferred carbides prepared in accordance with the present invention are refractory carbides made from elements of the group IIIa, IVa, IVb, Vb, VIb or VIIIb elements of the periodic table of elements. Examples of preferred carbon reactive elements for use in accordance with the present invention are boron, chromium, hafnium, iron, molybdenum, niobium, silicon, tantalum, titanium, tungsten, vanadium, and zirconium. It is possible to use carbon reactive elements in combination to make a mixed carbide structure. A preferred group IIIa element for use in accordance with the present invention is boron. Boron is especially preferred since boron carbide is almost as hard as diamond and is unaffected by moisture, or usual aqueous acids and alkalis.

The most preferred element of group IVa (excluding carbon which forms the carbon carbide "diamond"), is silicon. Silicon carbide is hard, high melting, almost chemically inert, and has excellent dielectric properties. Furthermore, the elements from which it is made are among the most abundant on earth. Silicon is the second most abundant element after oxygen and makes up about 25.7% of the earth's crust. Carbon is widely distributed in nature in carbonates, e.g. limestone, carbon dioxide, hydrocarbons and all living matter. Silicon may be in the form of a powder. Such silicon powders usually have an average particle size of less than 100 microns, preferably less than ten microns and in some circumstances less than one micron.

In forming carbides in accordance with the present invention, heating of the carbon and carbon reactive element by electromagnetic radiation usually occurs in an inert environment for from 1 to 30 minutes. The inert environment may be a vacuum or a non-reactive gas. A vacuum has particular advantages since in a vacuum there is no heat loss by convection and surrounding atmosphere does not have to be heated. The use of an inert gas has its own advantages since its presence provides a partial pressure which helps prevent evaporation or sublimation of carbon or the carbon reactive element. Preferred non-reactive gases are argon and helium but nitrogen may also be used in some circumstances.

Heating of the carbon and carbon reactive element is done either by applying a low frequency electromagnetic radiation at a frequency between about 50 and about 200 kilohertz or by applying microwave electromagnetic radiation at a frequency between about $3\times10^9$ and about $3\times10^{11}$ hertz. When microwaves are used, the frequency is frequently selected from of 915, 2450, 5800 and 22,125 megacycles per second, because such frequencies are commonly produced by commercially available equipment. The microwaves usually have a wavelength between about 0.1 and about 30 centimeters and are usually applied at a power of from about 2 to about 100 kilowatts. Microwaves are applied at sufficient power to heat the carbon and carbon reactive element to reaction temperature. When non-conductive carbon reactive elements such as silicon are used, the needed temperature results only from the heating of the carbon. The reaction temperature varies for various carbides but is easily determined by variation of applied power. Low frequency electromagnetic radiation is applied at a power of from about 1.5 to about 10 kilowatts for from about five to about 30 minutes. Again, power requirements and reaction temperature are readily determined for a particular carbide by increasing power until reaction occurs.

The following example serves to illustrate and not limit the present invention. Unless otherwise indicated, all parts and percentages are by weight.

Silicon carbide was made by induction heating of a mixture of carbon and silicon. In particular silicon and carbon were induction heated in a 6 inch diameter by 6 inch high quartz vacuum chamber placed on the coil of a 7.5 kW output induction power supply. The coil was constructed from eight turns of ¼ inch diameter copper tubing in either a pancake or spiral helical form. The coil had a 9/16 inch inside diameter and a 3¾ inch outside diameter.

A 3 inch by 3 inch by 0.060 inch thick piece of premium nuclear grade graphite foil having a minimum of 99.8 percent graphite was dried in an oven at about 300° F. to remove moisture. The dried graphite foil was placed within the quartz chamber on a 4.5 inch by 3 inch by ½ inch thick alumina refractory brick coated with boron nitride powder. Fifteen grams of 99+ percent pure silicon powder was then placed on the graphite. Another alumina refractory brick coated with boron nitride powder was then placed on top of the graphite foil. The lid was placed on the chamber and a vacuum of about 50 Torr was drawn using a ⅓ hp mechanical vacuum pump.

A current having a frequency of 136 kHz was then passed through the coil at a voltage increasing from 70 to 323 volts over a time period of 11 minutes. 323 volts were then held for 4 minutes and the power was shut off. As a result, the silicon-graphite combination was heated from 70° F. to about 2700° F. in 11 minutes resulting in a ramp of about 240° F. per minute followed by a hold of 4 minutes at between 2,600° F. and 2850° F. The product was then allowed to cool to ambient temperature.

The resulting product comprised about 50% by volume silicon carbide crystals and about 50% by volume of silicon that filled in essentially all available pores. The product had a density of almost 100% of theoretical.

What is claimed is:

1. A method for the manufacture of a structure of a carbide of aluminum, boron, chromium, hafnium, iron, molybdenum, niobium, silicon, tantalum, titanium, tungsten, vanadium or zirconium and having about 100 percent of theoretical density which comprises:

mixing elemental aluminum, boron, chromium, hafnium, iron, molybdenum, niobium, silicon, tantalum, titanium, tungsten, vanadium or zirconium in the form of a powder with the carbon in the form of a porous carbon structure; and heating the carbon and the elemental aluminum, boron, chromium, hafnium, iron, molybdenum, niobium, silicon, tantalum, titanium, tungsten, vanadium or zirconium to melt the elemental aluminum, boron, chromium, hafnium, iron, molybdenum, niobium, silicon, tantalum, titanium, tungsten, vanadium or zirconium in a vacuum or an inert atmosphere so that it fills the pores in the carbon structure and reacts with the carbon to form the carbide; wherein the carbon and elemental aluminum, boron, chromium, hafnium, iron, molybdenum, niobium, silicon, tantalum, titanium, tungsten, vanadium or zirconium are heated by means of electromagnetic radiation having a frequency that is a lower frequency than the frequency of the infrared spectrum.

2. The method of claim 1 wherein the carbon is reacted with aluminum or boron.

3. The method of claim 1 wherein the carbon is reacted with boron.

4. The method of claim 1 wherein the carbon is reacted with silicon.

5. The method of claim 1 wherein the heating occurs in an inert environment for from 1 to 30 minutes.

6. The method of claim 5 wherein the inert environment comprises a vacuum.

7. The method of claim 5 wherein the inert environment comprises a non-reactive gas.

8. The method of claim 7 wherein the non-reactive gas is selected from the group consisting of nitrogen, helium, and argon.

9. The method of claim 1 wherein the porous carbon structure comprises carbon fibers.

10. The method of claim 9 wherein the porous carbon structure comprises a carbon fiber sheet.

11. The method of claim 1 wherein the carbon is reacted with a silicon powder having an average particle size of less than 100 microns.

12. The method of claim 11 wherein the silicon powder has an average particle size of less than 10 microns.

13. The method of claim 12 wherein the silicon powder has an average particle size of less than 1 micron.

14. The method of claim 1 wherein the induction heating is done by applying low frequency electromagnetic radiation at a frequency between about 50 and about 200 kilohertz.

15. The method of claim 1 wherein the induction heating is done by applying microwave electromagnetic radiation at a frequency between about $1 \times 10^9$ and about $3 \times 10^{11}$ hertz.

16. The method of claim 15 wherein the frequency is selected from the group consisting of 915, 2450, 5800 and 22,125 megacycles per second.

17. The method of claim 15 wherein the microwaves have a wavelength between about 0.1 and about 30 centimeters.

18. The method of claim 15 wherein the microwaves are applied at a power of from about 10 to about 100 kilowatts.

19. The method of claim 14 wherein the low frequency electromagnetic radiation is applied at a power of from about 1.5 to about 10 kilowatts for from about five to about 30 minutes.

20. The method of claim 10 where the carbon fiber sheet comprises graphite fibers.

21. The method of claim 20 where the carbon fiber sheet is a graphite foil.

* * * * *